April 15, 1969     F. A. SILLS     3,439,273
ELECTRICAL MEASURING INSTRUMENT LIQUID DAMPING MEANS Filed May 29, 1967

Inventor
Frederick A. Sills
By Kenon Palmer,
Stewart & Estabrook
Attorneys () # United States Patent Office 3,439,273
Patented Apr. 15, 1969

3,439,273
ELECTRICAL MEASURING INSTRUMENT LIQUID DAMPING MEANS
Frederick Arthur Sills, Witham, Essex, England, assignor to Crompton Parkinson Limited, London, England, a British company
Filed May 29, 1967, Ser. No. 642,021
Claims priority, application Great Britain, June 2, 1966, 24,669/66
Int. Cl. G01r 1/14
U.S. Cl. 324—125          6 Claims

ABSTRACT OF THE DISCLOSURE

An electrical measuring instrument having a rotary moving part capable of longitudinal movement in relation to the remainder of the instrument and having a damping arrangement comprising cooperating pads of expanded polyethylene having a closed cell structure, which are fitted respectively to the moving part and to an adjacent fixed part so as to define a gap between adjacent surfaces of the pads which contains viscous liquid held in position by surface tension.

---

Electrical measuring instruments such as ammeters and voltmeters having a rotary moving part are normally fitted with some form of device for damping the rotary movement of this part, thus causing the pointer of the instrument to come to a standstill at the correct reading in a short space of time. When the moving part turns about pivots mounted in fixed jewels this type of damping is quite satisfactory. Many modern instruments, however, are fitted with sprung jewels or with a taut ribbon suspension which avoids the need for jewels altogether. Both these forms of suspension have a much greater resistance to shock than fixed jewels but the freedom thus given to the moving part means that it is susceptible to vibration in relation to the fixed parts of the instrument. The damping devices normally fitted are quite ineffective against such vibratory movement and the problems thus introduced have been one of the major disadvantages of instruments employing such suspensions.

According to the present invention an electrical measuring instrument of the kind referred to above, that is to say, having a rotary moving part capable of longitudinal movement in relation to the remainder of the instrument includes a damping arrangement comprising cooperating pads of a cellular elastomer having a closed cell structure which are fitted respectively to the moving part and to an adjacent fixed part, the gap between the adjacent surfaces of the pads containing viscous liquid held in position by surface tension. It is found that this combination of pads and the intervening liquid is highly effective in damping any incipient vibratory movement of the moving part of the instrument and thus overcomes the problem referred to above.

The effect of the closed cell construction of the pads is that their facing surfaces have a relatively large number of small open cells which assist in holding the viscous liquid in position between the pads and thus to help to prevent it being expelled from the gap by any incipient relative movement between them. Since the remainder of the cells throughout the body of each pad are not in connection with one another the body of each pad is relatively resilient and does not become saturated with the viscous liquid. The presence of the open cells in the cooperating faces of the two pads is essential since if pads of hard smooth material were to be used the liquid would be rapidly ejected from the space between the pads by the pumping effect of any vibratory motion.

The preferred material for the pads is expanded polyethylene such, for example, as that sold under the registered trademark, "Plastazote" by Expanded Rubber & Plastics Limited. Other expanded plastics may also be used as may expanded rubbers provided the cells are small enough to have the required surface tension effect in combination with the viscous liquid which is used.

The viscous liquid used should have a viscosity which does not vary appreciably with changes in temperature within the normal working temperature range of the instrument. Suitable liquids for this purpose are the polydimethylsiloxanes. When using liquids such as these a gap between the two pads of between 0.010 and 0.015 in. is found to be suitable, the actual magnitude of the gap being chosen to suit the parameters of the moving part in question.

The two pads may be mounted to cooperate in several different ways. Most simply the pads are annular and of substantially the same diameter, the gap between them being defined between the longitudinally spaced faces of the pads. With this arrangement the liquid between the pads is in the form of a flat annulus. As an alternative the pads may be annular and of differing diameters so that one fits inside the other and the gap is defined between the cylindrical faces of the pads. With such a construction the inner pad may have a flange extending close to the end of the outer pad so as to define a further radially extending portion of the gap.

Constructions in accordance with the invention will now be described by way of example with reference to the accompanying drawings in which.

Figure 1:
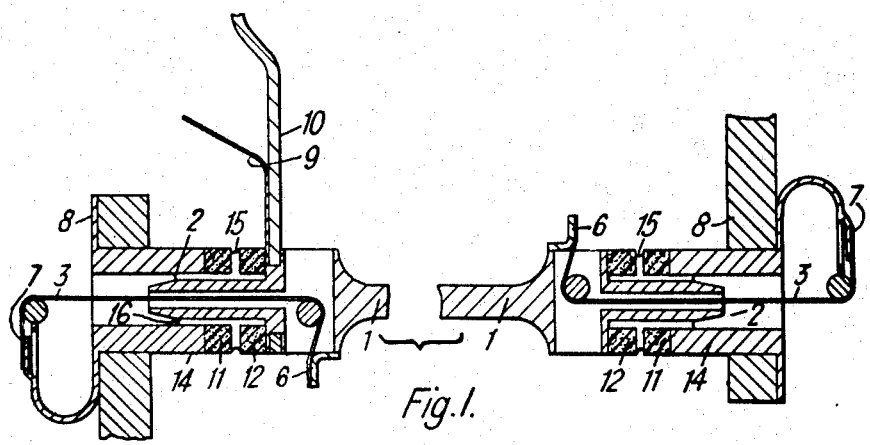
FIGURE 1 is a sectional view to an enlarged scale of the two ends of the moving part of the electrical measuring instrument with the central portion broken away.

Turning first to FIGURE 1 the main body of the moving part is broken away but each end comprises a rotary staff 1, each end of which defines a hollow spigot 2 through which passes a tensioned filament 3 forming the suspension for the instrument. Each filament 3 extends from an anchorage 6 on the moving part of the instrument to an anchorage 7 on a fixed part 8 of the instrument. As so far described the instrument is symmetrical at both ends and the two filaments 3 suspend the moving part for free rotary movement as indicated by a pointer 9 which extends adjacent a balance arm 10.

Vibratory movement of the moving part is damped by pairs of pads 11 and 12 at each end. Each pad 11 is secured to a fixed part 14 while each pad 12 is fixed to a seating on the staff 1. Each pad is annular in shape and the cooperating surfaces are axially spaced to leave a gap 15 filled with a viscous liquid which is thus in the form of a flat annulus. The pads 11 and 12 are made of a cellular elastomer having a closed cell construction as previously described and the gaps 15 are of such a dimension that the viscous liquid is held in position by surface tension. In practice any excess of viscous liquid will extend into the space between the spigot 2 and the part 14 as indicated at 16. The presence of this additional liquid is generally advantageous and for this reason the end of the spigot 2 is chamfered to assist in retaining the liquid in place.

The suspension provided by the filaments 3 allows the moving part to vibrate both axially and transversely but it is found that such movement is immediately damped by the combination of the pads 11 and 12 and intervening liquid. Moreover the combination also damps the rotary movement of the moving part so that no additional damping device is required for this purpose.

Figure 2:
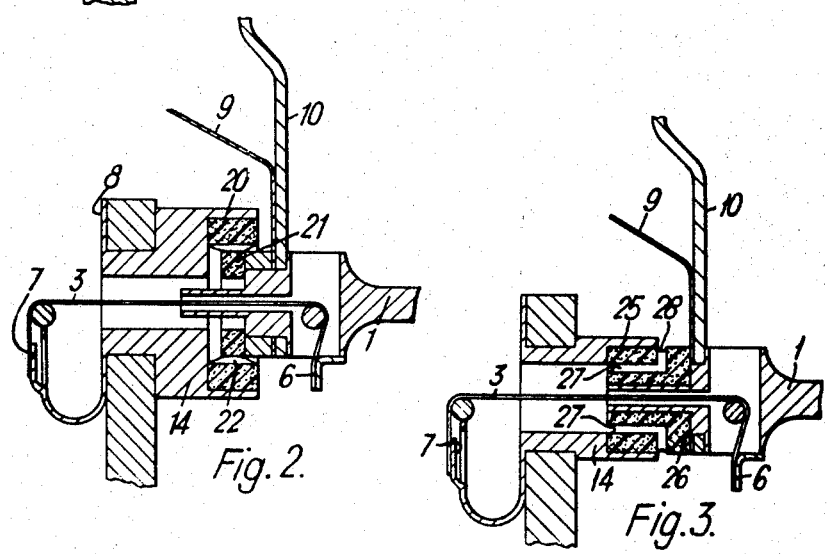
FIGURES 2 and 3 are corresponding views of one end only of alternative constructions; and, FIGURE 4 is a view of a construction similar to that of FIGURE 1 but in which the moving part is fitted with a sprung jewel instead of a taut ribbon suspension.
Figure 3:
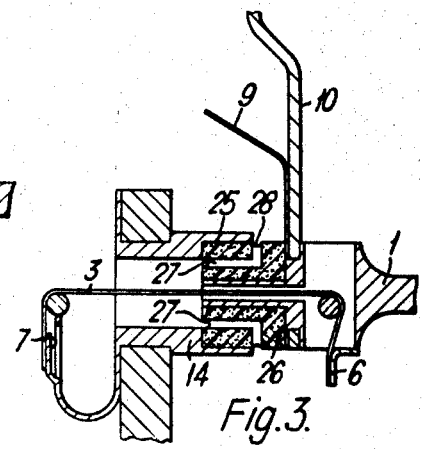

FIGURES 2 and 3 show alternative forms of pad, the remainder of the construction being the same as shown in FIGURE 1 and being denoted by the same reference numerals. In the construction of FIGURE 2 the pads shown as 20 and 21 are cylindrical, the pad 20 being spaced outwardly from the outer surface of the pad 21 to leave an annular gap 22 for the viscous liquid which is thus in the form of a hollow sylinder. In FIGURE 3 an outer pad 25 is annular while an inner par 26 is also annular but has a flange extending close to the end of the outer pad 25. As a result the gap between the two pads has a cylindrical portion 27 similar to the gap 22 in the construction of FIGURE 2 and a radially extending portion 28 similar to the gap 15 in FIGURE 1.

Figure 4:
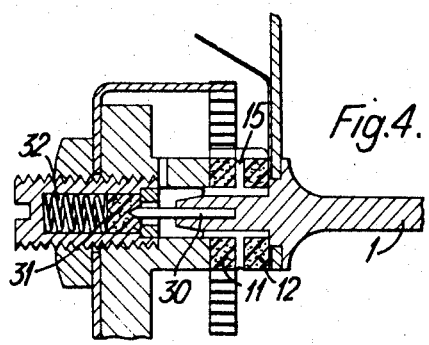

In the construction of FIGURE 4 the taut filament 3 of FIGURE 1 is replaced by the combination of a pivot 30 mounted in the end of the spigot 2 which is seated in a jewel 31 loaded by means of a spring 32. This permits longitudinal movement of the moving part of the instrument but without the same degree of lateral freedom as in the constructions of FIGURES 1 to 3. The damping arrangement is exactly the same as described with reference to FIGURE 1 and the parts are indicated by the same reference numerals. It is found that this form of damping arrangement is equally effective with a sprung jewel bearing as with a taut ribbon suspension.

In any of the constructions illustrated the pads and the gaps between them need to be proportioned in relation to the operating characteristics of the instrument and the viscosity of the liquid in the respective gaps. The material of the pads is preferably expanded polyethylene as previously described while the viscous liquid is preferably polydimethylsiloxane also as previously mentioned. It is important that damping should be applied to both ends of the moving part as shown in FIGURE 1 and the arrangements of FIGURES 2 to 4 are therefore duplicated on the opposite end of the moving part.

I claim:

1. In an electrical measuring instrument having a rotary moving part capable of longitudinal movement in relation to the remainder of the instrument, a damping arrangement comprising first and second cooperating pads having cooperating surfaces, said pads being of a cellular elastomer having a closed cell structure presenting a plurality of small open cells in said cooperating surfaces, means mounting said first pad for rotation with said moving part, means mounting said second pad to a fixed part of said instrument, whereby to define a gap between said cooperating surfaces of said pads, and viscous liquid held in position in said gap by surface tension.

2. An electrical measuring instrument according to claim 1, in which said pads consist of expanded polyethylene.

3. An electrical measuring instrument according to claim 1, in which said viscous liquid is a polydimethylsiloxane and said gap has a width between 0.010 and 0.015 inch.

4. An electrical measuring instrument according to claim 1, in which said pads are annular and of substantially equal diameters, said gap being defined between the longitudinally spaced faces of the pads.

5. An electrical measuring instrument according to claim 1 in which said pads are annular and of differing diameters whereby said first pad fits inside said second pad and said gap is defined between cylindrical faces of said pads.

6. An electrical measuring instrument according to claim 5, in which said first pad has a flange, said flange extending close to the end of said second pad so as to define a further radially extending portion of said gap.

References Cited

UNITED STATES PATENTS 2,779,442   1/1957   Bacon _____ 324—125 XR
3,102,233   8/1963   Charbonneaux _____ 324—125

RUDOLPH V. ROLINEC, *Primary Examiner.*

A. E. SMITH, *Assistant Examiner.*

U.S. Cl. X.R.

188—90; 248—358